Aug. 19, 1924.

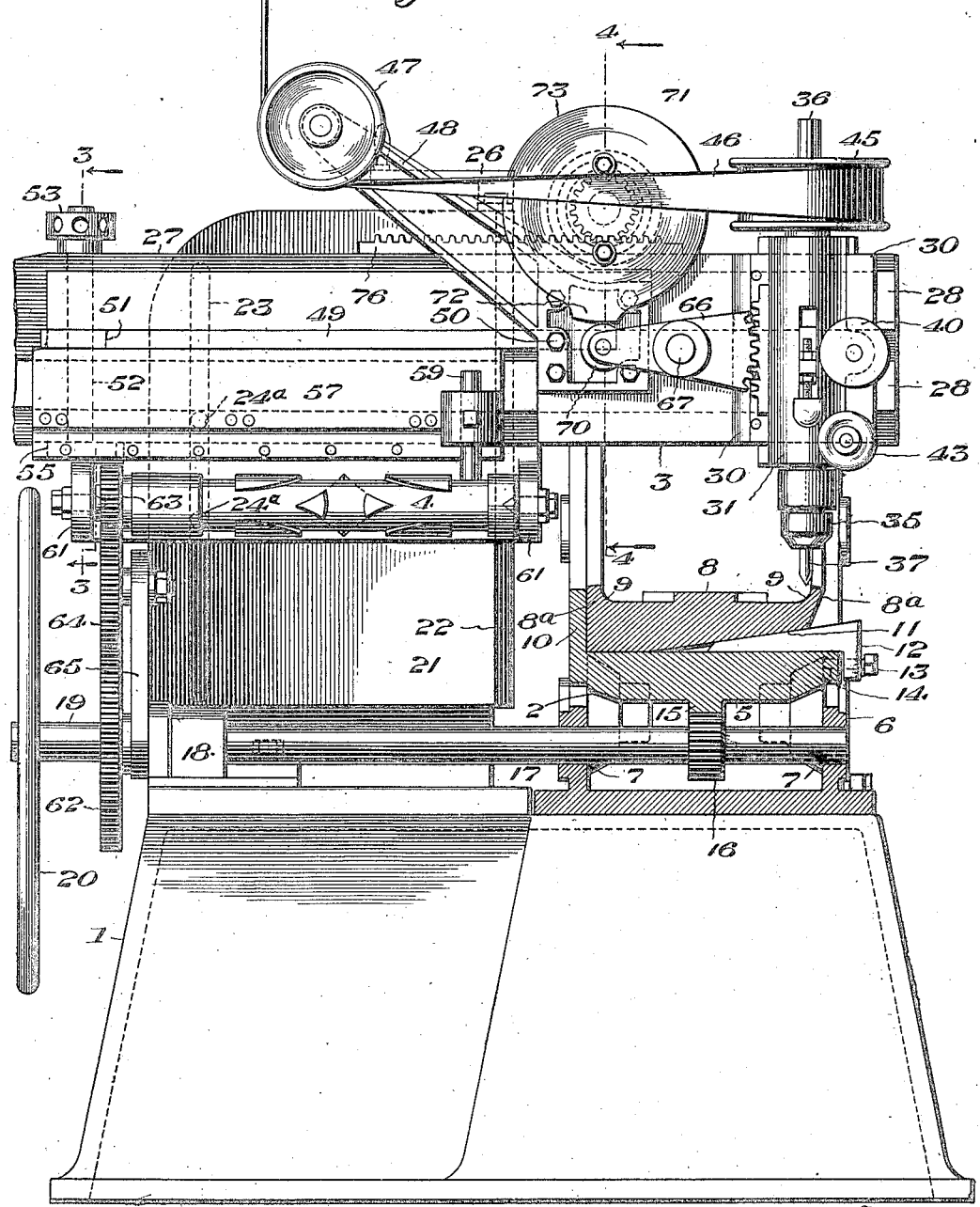

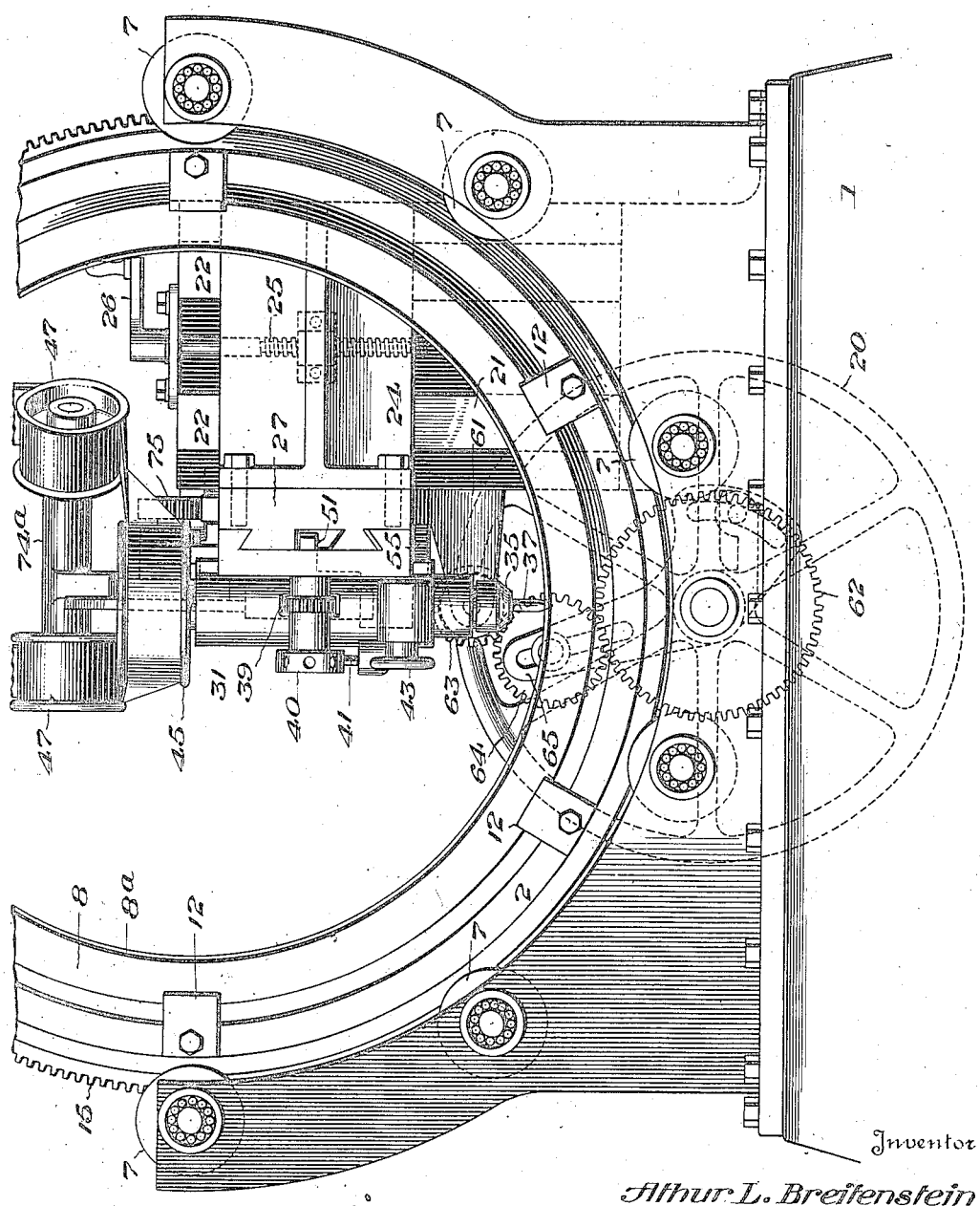

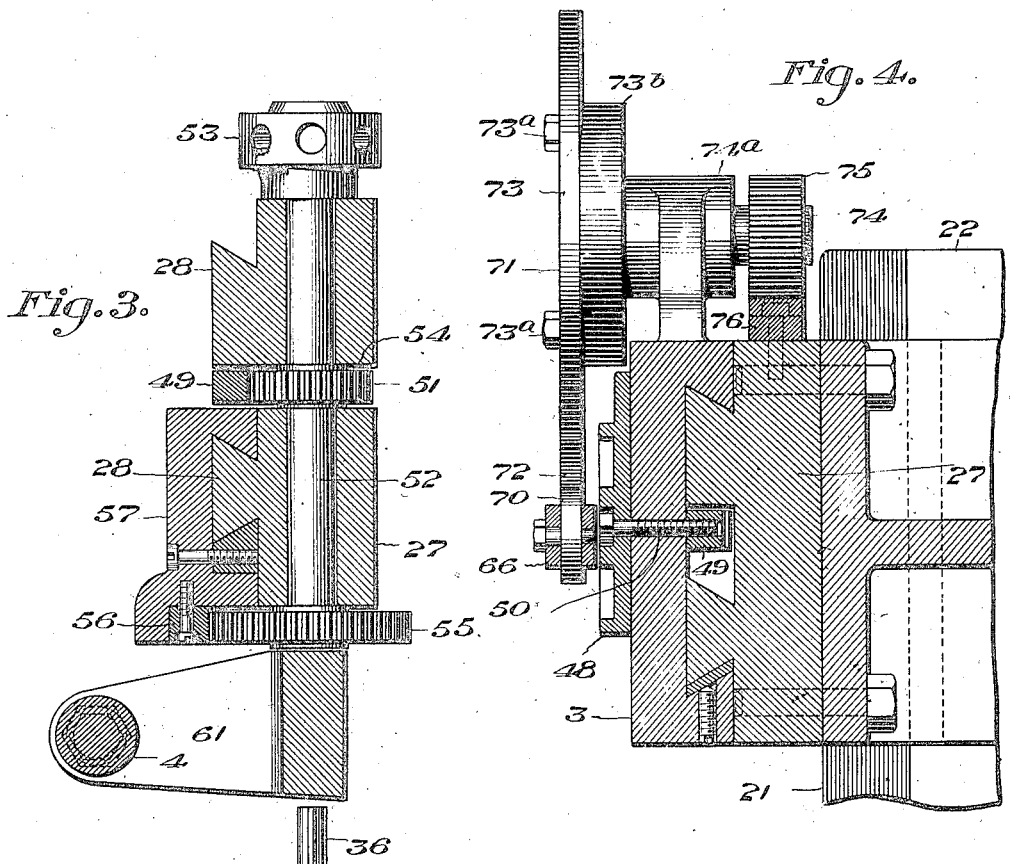
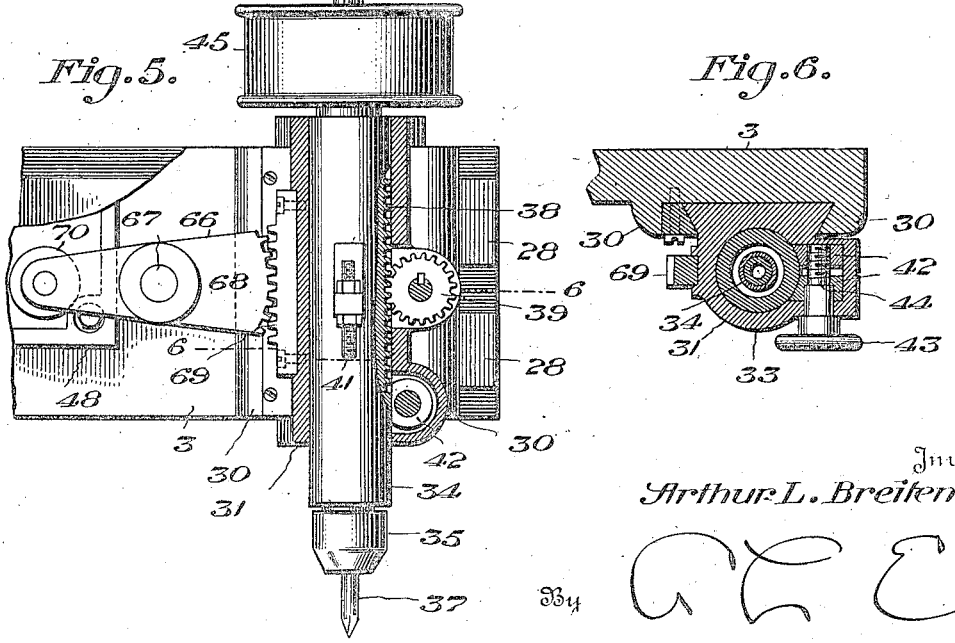

A. L. BREITENSTEIN

MOLD CUTTING MECHANISM

Filed June 15, 1922      4 Sheets-Sheet 4

1,505,579

Inventor
Arthur L. Breitenstein

Attorney

Patented Aug. 19, 1924.

1,505,579

UNITED STATES PATENT OFFICE.

ARTHUR L. BREITENSTEIN, OF AKRON, OHIO.

MOLD-CUTTING MECHANISM.

Application filed June 15, 1922. Serial No. 568,377.

*To all whom it may concern:*

Be it known that I, ARTHUR L. BREITENSTEIN, a citizen of the United States, residing at Akron, in the county of Summit, State of Ohio, have invented certain new and useful Improvements in Mold-Cutting Mechanism, of which the following is a specification.

My invention relates, broadly, to mechanism for cutting designs in annular molds, such, for instance, as those used in forming non-skid patterns upon the tread surface of resilient tires.

Machines for cutting or engraving tire mold rings have heretofore been available, but so far as I am aware, such machines have been designed for operating upon molds for pneumatic tires, and are not adaptable for use in conjunction with molds for use with tires having a comparatively flat tread surface such as those of the cushion or solid variety. Prior to my invention, the operation of producing a design upon molds for solid or cushion tires having transversely flat tread surfaces has been performed entirely by hand which is laborious and time consuming in the extreme, or such molds have been provided with molded matrix sections which are difficult to produce with such accuracy of design that they can be properly aligned in annular form within the mold. Furthermore, the production of such matrix plates by molding is expensive, requiring, as it does, special apparatus and operators skilled in the use thereof.

It is the primary purpose of the present invention to provide a practical form of mechanism for cutting, or engraving, either the inner surface of molds having a substantially flat transverse surface, or for performing this operation upon the matrix plates of all types of molds.

It is a particular object of the invention to provide a form of mechanism for use in effecting the above described operation upon the matrix plates of a mold that is adapted to produce a substantially flat tread surface upon a tire and rounded edges upon each side of the tread surface, although the principle of the invention may be used in the engraving of rings with other surfaces, if desired.

The invention also seeks to provide a cutting mechanism through the use of which a unit of a pattern may be reproduced a number of times around an annular object without stopping the mechanism or resetting any part thereof.

Another object of the invention is to provide a mechanism adapted for the above purposes that operates on the principle of a pantograph, whereby the pattern upon the mold is reproduced at a reduced scale as compared with a tool controlling element that embodies a unit of the pattern.

Other objects and advantages will, in part, become apparent, and, in part, be set forth in detail, as the following description is read in the light of the accompanying drawings which form a part of this specification.

In the drawings:

Figure 1 is a front elevation of an apparatus constructed in accordance with my invention;

Figure 2 is a side elevation looking at the right side of Figure 1;

Figure 3 is a sectional view, on an enlarged scale, taken on the line 3—3 of Figure 1;

Figure 4 is a sectional view, on an enlarged scale, taken on the line 4—4 of Figure 1;

Figure 5 is a view partly in elevation and partly in section, drawn to an enlarged scale and illustrating a cutting tool holder, used in the practice of my invention, and certain detail parts associated therewith;

Figure 6 is a horizontal section, on the line 6—6 of Figure 5;

Figure 7:
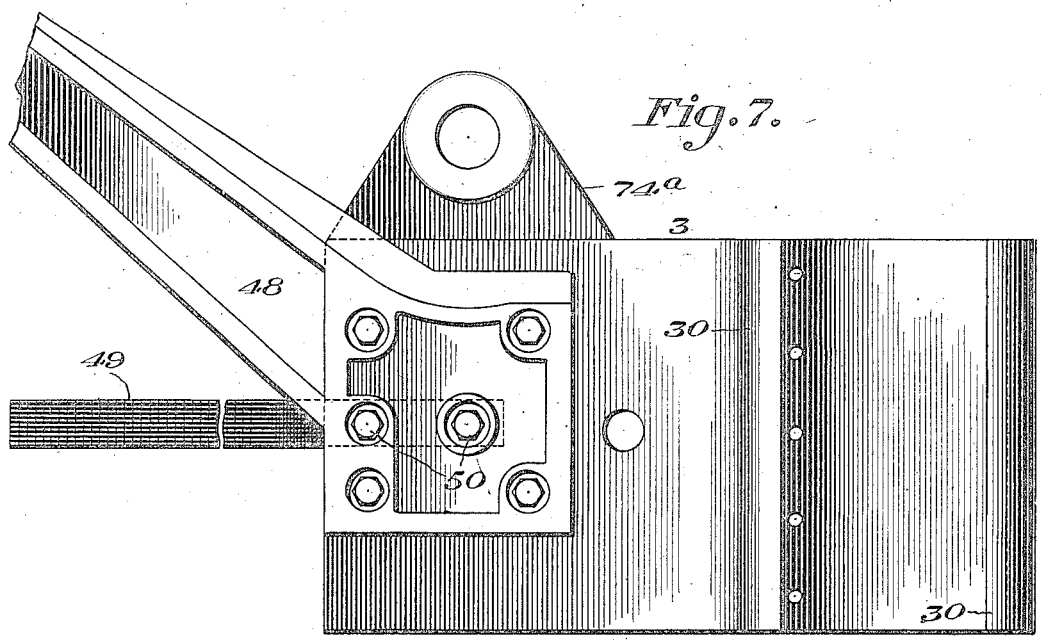
Figure 7 is an elevational view, on an enlarged scale, of a slide upon which the tool holder is carried.
Figure 8:
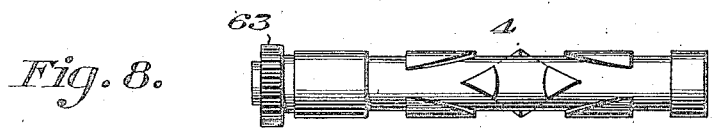
Figure 8 is a detail of the tool controlling element.
Figure 9:
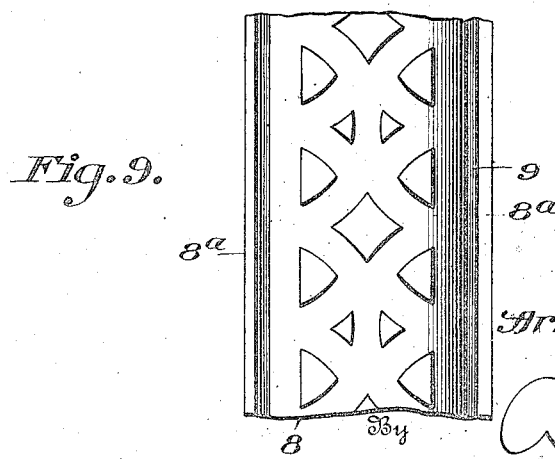
Figure 9 is a view of a portion of a matrix plate showing one design that may be cut thereon through the use of my novel apparatus.

The mechanism of my invention, briefly described, in its preferred form, comprises a base portion, designated 1 in the drawings, which supports a work holder 2, a tool carriage 3 and a tool controlling element 4, all of which will now be described in detail.

The work holder 2 is located at one side of the center line of the base 1 and comprises an annulus 5 supported for rotation upon a frame 6 by means of roller bearings 7, the annulus being open at one side thereof to receive a mold, or a series of matrix plates, one of which is shown in section and in proper position upon the annulus at 8. The type of plate shown in the drawing is provided with substantially radial edge flanges 8ª that have their inner faces curved in transverse section, as shown at 9, to provide rounded edges upon the tread face of the tire. As previously stated, my mechanism is particularly designed for cutting a design upon the mold face of a plate of this character, as will presently appear.

The number of plates 8 required to form an annulus are assembled within the holder 2 and are properly aligned by positioning them against a radial flange 10 that is provided upon the holder 2. Any suitable arrangement of devices for centering the assembled matrix plates 3 relative to the holder 2 may be utilized. Plates of the character shown are usually provided with a transversely inclined outer face, as shown at 11, and therefore wedges 12 that are adjustable transversely of the holder may be advantageously utilized in the manner illustrated in the drawings. In this instance, the wedges each carry a screw 13 which engages in a suitable opening 14 in the forward edge of the holder 2 whereby the wedges are adapted for individual adjustment between the inner face of the holder 2 and the outer inclined face 11 of one of the plates 8. By using wedges of different sizes and constructions, the matrix plates for molds of different sizes may be centered and clamped upon the holder 2, as will be apparent without further explanation.

Upon the outer face of the holder 2 and preferably centrally thereof, an annular rack 15 is provided which is engaged by a toothed pinion 16 that is fast upon and adjacent one end of a manually rotatable shaft 17. The end of the shaft 17 that carries the pinion 16 extends transversely of the holder 2 and is journaled, beneath said holder, in the frame 6 and in vertical alignment with the center of the holder as will be seen by reference to the drawings. Adjacent its opposite end, the shaft 17 is journaled in a bearing 18 that is mounted at the edge of the base 1 remote from the holder 2. An extended portion 19 of the shaft projects beyond the bearing and is equipped, at its extremity, with a hand wheel 20 by means of which the shaft and the work holder may be rotated.

At the rear of the base 1 and to one side of the work holder 2, a standard 21 is mounted, that is provided upon its side face adjacent the holder with vertical guides 22 and upon its front face with a vertical slot 23. A bracket 24 is arranged upon the guides 22 for adjustment thereon. Any suitable devices may be provided for adjusting the bracket 24, such as the screw shaft 25 and the crank 26, the arrangement of which will be readily understood from an inspection of Figure 2 of the drawings.

The bracket 24 carries a horizontally disposed elongated guide member 27 that is disposed in parallelism with the shaft 17, but slightly to the rear thereof and to the rear of the vertical center of the work holder. One end of the member 27 extends through the work holder 2, transversely thereof, while the other end thereof projects over and beyond the hand wheel 20. The member 27, as will be seen from the foregoing description, is adjustable vertically of the standard 21 and in a plane offset from the vertical center of the work holder. In order to lock the member 27 against vertical movement, headed bolts 24ª are provided thereon in position to pass through the slot 23 in the standard 21.

Upon the forward face of the member 27, a pair of parallel spaced guide rails 28 are provided, one above the other, as best shown in Figures 3 and 4, in position to extend substantially the entire length of said member. The ends of the rails that thus project through the work holder 2 serve to support the tool carriage 3, previously mentioned, for sliding movement thereon, as best shown in Figures 1 and 5.

The tool carriage 3 is relatively short as compared with the member 27, and is provided adjacent one end thereof with vertical guides 30 between which a tool holder is mounted for vertical movement relative to the carriage by devices presently described. The tool holder, in this instance, comprises a slide 31 having a cylindrical portion 33. Within the cylindrical portion 33 a construction is preferably utilized that comprises an outer casing 34 adapted to support for rotary movement therein a tool chuck 35 having a spindle 36. Any suitable form of tool may be employed in connection with the chuck 35, such as that indicated at 37. The casing 34, as will be seen by reference to Figure 5, is provided with a rack 38 which is engaged by a toothed pinion 39 operated by a hand wheel 40, and a stop 41 is provided on said casing that projects through a slot in the cylinder 31. By means of this construction, the tool 37 may be adjusted relative to the slide 31 to initially position it against the work and to gauge the depth of the cut as desired. Means for clamping the tool in adjusted position relative to the slide 31 are provided in the form of clamping nuts 42 which may be drawn together by means of the hand wheel 43 and screw bolt 44 to hold the casing 34 against movement. The tool spindle 36 is provided with a splined pulley 45 that is driven by a belt 46, as shown in Figures 1 and 2. Suitable idlers 47 are provided for the belt 46, the idlers in this instance being journaled in a bracket 48 that projects from the face of the tool carriage 3.

The tool carriage together with the parts described as carried thereon are reciprocated upon the rails 28 to move the tool 37 across the face of the matrix plates by the following devices:

One end of an elongated rack 49 is secured to the rear of the carriage 3, as at 50, in position to project therefrom and to travel against the lower face of the upper rail 28. This rack 49 is engaged and moved by a toothed pinion 51 fast upon a vertical shaft 52 that is journaled in the member 27 and rotated by a hand wheel 53. A slot 54 is cut in the member 27 through which said pinion 51 projects. The lower end of the shaft 52 carries a second toothed pinion 55 of larger diameter than the pinion 51. The pinion 55 meshes with a rack 56 suitably secured upon the rear face of a slide 57 that is suspended upon the lower rail 28 for movement longitudinally thereof. The slide 58 carries at one end thereof a vertically disposed adjustable pin 59 that engages a pattern roll which constitutes the before mentioned tool controlling element 4.

The pattern roller is journaled for rotation about a horizontal axis between spaced brackets 61 that project from the lower edge of the member 27 and beneath the slide 57 and has the pattern formed thereon in such manner that the pin 59 travels in slots and grooves corresponding to the design that is to be cut in the matrix plates. The pattern roll is designed to be rotated simultaneously with the work support, but at a faster speed whereby the design is cut in the plates 8 on a reduced scale as compared with its size upon the roll 4. The means for securing this different ratio of speeds in the rotation of the work holder and the pattern roll comprises a large gear 62 upon the extension 19 of the shaft 17 which drives a smaller gear 63 fast upon one end of the roll 60, the two gears being connected for driving relation by means of an idler gear 64 that is carried upon a pivoted bracket 65. The bracket 65 is journaled for swinging movement upon the shaft 17 so that it may be adjusted and different sizes of gears substituted for the gears 62 and 63 for the purpose of changing the ratio of speeds of the work holder 2 and the roll 60. By this means the operator may determine the scale at which the pattern upon the roll 60 will be reproduced upon the matrix plates and adjust the mechanism to reproduce the pattern the correct number of times in accordance with the circumference of the work being operated upon.

As the work holder 2 and the pattern roll are rotated, the operator, at the same time, feeds the tool carriage 3 and hence the tool 37 over the work by following the pattern upon the roll 60 with the pin 59. By virtue of the arrangement of the gears 51 and 55 and the manner of mounting the slide 57, the pin may be moved to follow the pattern upon the roll and at the same time the carriage 3 is controlled thereby to move at a slower speed. This latter feature, i. e., that of reproducing the pattern at a reduced scale from a larger pattern and through means including a rotating roll, insures against imperfections in the larger pattern being reproduced on such a scale that they will be obvious to the naked eye. By the arrangement described, it is possible to reproduce the pattern on the mold as often as desired without stopping to reset the machine. This is a considerable improvement over prior engraving machines which have required a resetting of the work after a pattern was reproduced once in the mold.

Means are provided for automatically adjusting the tool 37 to follow the curve 9 of the flanges 8 upon the work when the tool 37 reaches either edge of the plate and comprises the following which may also be used for obtaining other curvatures in the work, provided the parts are designed accordingly.

An oscillating segment 66 is pivoted, as at 67 to the carriage 3, and is provided at one end with teeth 68 meshing with a rack 69 suitably affixed to the tool holder 31, as shown in Figures 1 and 5. A roller 70 is provided upon the segment which is engaged by a rotary cam member 71 having a high portion 72 and a concentric periphery 73. The cam is bolted, as at 73$^a$, upon a rotary holder 73$^b$, upon which it is adjustable to properly time its operation. The cam 71 and holder 73$^b$ are carried by a shaft 74 that is journaled in a bracket 74$^a$ arising from the top edge of the carriage 3 whereby they travel with the carriage during the cutting operation. During such operation the cam and holder are rotated by means of a toothed pinion 75, fast upon one end of the shaft 74, and in mesh with an elongated rack 76 that is suitably affixed to the member 27 in the manner shown in Figures 1 and 4 of the drawings. The cam 71 is so constructed that the high portion 72 thereof engages the roller 70 of the segment 66 and rocks said segment to lift the tool holder 31 in the guides 30 of the carriage as the tool reaches either curve 9 of the flanges 8. Also it is so timed in its operation and with relation to the movement of the carriage that the tool is lifted in an arc conforming to the curve of said flanges. With the form of cam illustrated and during the time that the roller 70 engages the concentric portion 73 thereof, the tool will obviously cut to a uniform depth across the work or plates 8. However, other forms of cams may be substituted for that shown whereby the tool may be actuated to effect a concave or a convex cut across the work, as will be readily understood. Also other pattern rolls 4 may be substituted for that shown and the ratio of speed of the slide 57, and the carriage 29 changed by the use of different gears for the gears 51 and 55.

The operation of my invention, it is believed, will be clear from the foregoing and therefore further description thereof is not deemed necessary herein.

Although the invention has been described in detail, and certain specific terms utilized herein, it is to be understood that the present disclosure is illustrative and is therefore not to be considered as limiting the scope or spirit of the invention unless such limitations are specified in the claims appended hereto.

What I claim is:

1. Mechanism for engraving annular objects comprising, a rotatable support for the object, a rotatable element having a pattern thereon, means operable to effect a differential rotation of the support and the element, a tool carriage having a tool thereon said carriage being operable to traverse the object, and means adapted to control the operation of the carriage in accordance with the pattern upon said element.

2. Mechanism for engraving annular objects comprising, a rotatable support for the object, a rotatable element having a pattern thereon, means operable to effect simultaneous rotation of the element and the support, a tool carriage, a tool mounted on the carriage to be movable thereon, said carriage being operable to traverse the object, means adapted to control the operation of the carriage in accordance with the pattern on said element, and means for automatically moving the tool relative to the carriage.

3. A machine for engraving annular objects, comprising a rotating holder for the object, a tool movable transversely of the object, a pattern and a pattern follower, and reduction gearing between the pattern and the holder on the one hand and the pattern follower and the tool on the other.

4. Mechanism for engraving annular objects comprising, a movable support for the object, a movable element having a pattern thereon, a tool, a tool carriage operable to move the tool over the object, means operable to effect differential movement of the support and the element, and means for automatically moving the tool relative to the carriage.

5. Mechanism for engraving annular objects comprising, a movable support for the object, a movable element having a pattern thereon, a tool operable to reproduce said pattern on the object, means operable to effect differential movement of the support and the element, and means for effecting the reproduction of the pattern on a smaller scale relative to the scale of the pattern on said element.

6. Mechanism for engraving annular objects comprising, a movable support for the object, a movable element having a pattern thereon, a tool operable to reproduce said pattern on the object, means operable to effect differential movement of the support and the element, means for effecting the reproduction of the pattern on a smaller scale relative to the scale of the pattern on said element, and means for automatically moving the tool toward and away from the axis of the object.

7. Mechanism for engraving annular objects comprising, a rotatable support for the object, a rotatable element having a pattern thereon, means operable to simultaneously rotate the support and the element, a tool carriage, a tool upon the carriage, a pattern follower for connecting the carriage with the element, and means operable to simultaneously move the carriage and follower at different speeds.

8. Mechanism for engraving annular objects comprising, a rotatable support for the object, a rotatable element having a pattern thereon, means operable to effect differential rotation of the support and the element, a tool carriage, a tool upon the carriage, a pattern follower for connecting the carriage and the element, and means operable to simultaneously move the carriage and follower at different speeds.

9. Mechanism for engraving annular objects comprising, a rotatable support for the object, a rotatable element having a pattern thereon, means operable to effect differential rotation of the support and the element, a tool carriage operable to traverse the object, a tool mounted upon the carriage for movement relative to the carriage, a pattern follower for connecting the carriage and the element, means operable to simultaneously move the carriage and follower at different speeds, and means for automatically moving the tool relative to the carriage as said carriage traverses the object.

10. Mechanism for engraving annular objects comprising, a rotatable support for the object, a rotatable pattern roll, a common driving mechanism operable to effect differential rotation of the roll and the support, a tool carriage, a tool upon the carriage adapted for movement relative thereto, a pattern follower for connecting the carriage and the roll, and means operable to simultaneously move the carriage and the follower at different speeds.

11. Mechanism for engraving annular objects comprising, a rotatable support for the object, a rotatable pattern roll, a common driving mechanism operable to effect differential rotation of the roll and the support, a tool carriage, a tool upon the carriage adapted for movement relative thereto, a pattern follower for connecting the carriage and the roll, means operable to simultaneously move the carriage and the follower at different speeds, and means for automatically moving the tool relative to the carriage.

12. Mechanism for engraving annular objects comprising, a rotatable support for the object, a rotatable element having a pattern thereon, a common driving mechanism operable to effect differential rotation of the support and the element, a tool carriage, a tool upon the carriage, a pattern follower for connecting the carriage and the element, and a common driving mechanism operable to simultaneously effect differential movement of the carriage and the follower.

13. Mechanism for engraving annular objects comprising, a rotatable support for the object, a rotatable roll having a pattern thereon, a common driving mechanism operable to effect differential rotation of the support and the roll, a tool carriage, a tool support upon the carriage, a tool adjustably mounted in the support, a follower for connecting the carriage and the roll, and a common driving mechanism operable to move the follower and carriage at different speeds.

14. Mechanism for engraving annular objects comprising, a rotatable support for the object, a rotatable element having a pattern thereon, a common driving mechanism operable to effect differential rotation of the support and the element, a tool carriage, a tool support upon the carriage mounted to reciprocate thereon, a tool mounted upon the support, a follower for connecting the carriage with the rotatable element, means operable to move the carriage and follower at different speeds, and means for automatically moving the tool support upon the carriage.

15. Mechanism for engraving annular objects comprising, a rotatable support for the object, a rotatable element having a pattern thereon, means operable to simultaneously rotate the support and the element, a tool carriage, a follower for connecting the carriage with the element, means operable to simultaneously move the carriage and the follower at different speeds, a reciprocatory tool support upon the carriage, a tool mounted upon the support, and means for automatically reciprocating the support.

16. A machine for engraving the inner surface of annular rings comprising, a tool carrier movable parallel to the axis of the ring, a tool holder mounted on said carrier and movable at an angle to the carrier, and means governed by the movement of the carrier and independent of the pattern for moving the tool holder thereon.

17. A machine for engraving the inner surface of annular rings comprising, a tool carriage movable parallel to the axis of the ring, a tool holder slidably mounted on the carriage at an angle to the movement thereof, a rotary cam on the carriage for controlling the movement of the tool holder, and means to rotate the cam by movement of the carriage.

18. A machine for engraving the inner surface of annular rings comprising, a holder for the ring, a roll having a pattern thereon, means for simultaneously rotating the holder and the roll, a tool carriage movably axially of the ring, a tool holder on the carriage movable toward and away from the axis of the ring, a pattern follower on said carriage, and means for simultaneously moving the carriage and the tool holder.

19. In a machine for engraving annular objects, a movable carriage, a pattern and a pattern follower to control the movement of the carriage, a tool slidably mounted in the carriage, and means independent of the pattern and pattern follower to raise and lower the tool during the operation of the carriage.

20. In a machine for engraving annular objects, a pattern controlled carriage movable transversely of the object, a tool slidably mounted in the carriage and movable toward and from the axis of the object, and automatically actuated means independent of the pattern to control the sliding movement of the tool.

ARTHUR L. BREITENSTEIN.